United States Patent
Morrison et al.

(10) Patent No.: US 10,669,355 B2
(45) Date of Patent: Jun. 2, 2020

(54) PHOSPHINIMINE AMIDO-ETHER COMPLEXES

(71) Applicant: NOVA Chemicals (International) S.A., Fribourg (CH)

(72) Inventors: Darryl Morrison, Calgary (CA); P. Scott Chisholm, Calgary (CA); Cliff Baar, Calgary (CA); Graham Lee, Calgary (CA); Janelle Smiley-Wiens, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 16/394,232

(22) Filed: Apr. 25, 2019

(65) Prior Publication Data

US 2019/0330387 A1    Oct. 31, 2019

Related U.S. Application Data

(60) Provisional application No. 62/662,915, filed on Apr. 26, 2018.

(51) Int. Cl.
    *C08F 4/64*    (2006.01)
    *C08F 4/642*   (2006.01)
    *C08F 210/16*  (2006.01)

(52) U.S. Cl.
    CPC ........ *C08F 4/64117* (2013.01); *C08F 4/6428* (2013.01); *C08F 210/16* (2013.01)

(58) Field of Classification Search
    CPC .................................................. C08F 4/64062
    See application file for complete search history.

(56) References Cited

U.S. PATENT DOCUMENTS

| | | |
|---|---|---|
| 3,248,179 A | 4/1966 | Norwood |
| 3,324,095 A | 6/1967 | Carrick et al. |
| 4,325,849 A | 4/1982 | Rosen et al. |
| 4,528,790 A | 7/1985 | Lo et al. |
| 4,613,484 A | 9/1986 | Ayres et al. |
| 5,462,999 A | 10/1995 | Griffin et al. |
| 5,589,555 A | 12/1996 | Zboril et al. |
| 5,684,097 A | 11/1997 | Palmroos et al. |
| 6,024,483 A | 2/2000 | Burke et al. |

(Continued)

OTHER PUBLICATIONS

ASTM D6474-99 (Reapproved 2006); Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved in 1999. Last previous edition approved in 1999 as D6474-99. pp. 1-6.

(Continued)

*Primary Examiner* — Catherine S Branch
(74) *Attorney, Agent, or Firm* — Thomas J. Styslinger

(57) ABSTRACT

Provided in this disclosure are organometallic complexes that contain i) a metal atom selected from Hf and Zr; 2) a phosphinimine ligand; 3) an amido-ether ligand and at least one other ancillary ligand. The use of such a complex, in combination with an activator, as an olefin polymerization catalyst is demonstrated. The catalysts are effective for the copolymerization of ethylene with an alpha olefin (such as 1-butene, 1-hexene, or 1-octene) and enable the production of high molecular weight copolymers (Mw greater than 25,000) with good comonomer incorporation at high productivity.

5 Claims, 1 Drawing Sheet

Ethylene Consumption Profiles for Polymerization Runs 1 to 3.

(56) References Cited

U.S. PATENT DOCUMENTS

| | | | |
|---|---|---|---|
| 6,063,879 | A | 5/2000 | Stephan et al. |
| 6,103,657 | A | 8/2000 | Murray |
| 6,147,172 | A | 11/2000 | Brown et al. |
| 6,239,238 | B1 | 5/2001 | Brown et al. |
| 6,320,005 | B1 | 11/2001 | Murray |
| 6,610,627 | B2 | 8/2003 | Murray |
| 2002/0049288 | A1 | 4/2002 | Goh et al. |

OTHER PUBLICATIONS

Pangborn, Amy B.; Giardello, Michael A.; Grubbs, Robert H.; Rosen, Robert K. and Timmers, Francis J.; Safe and Convenient Procedure for Solvent Purification; 1996 American Chemical Society, Organometallics, vol. 15, pp. 1518-1520.

Courtenay, Silke; Wei, Pingrong and Stephan, Douglas W.; The syntheses and structures of lithium phosphinimide and phosphinimine complexes; 2003 NRC Canada, Canadian Journal of Chemistry, vol. 81. pp. 1471-1476.

Boussie, Thomas R; Diamond, Gary M.; Goh, Christopher; Hall, Keith A.; Lapointe, Anne M.; Leclerc, Margarete; Lund, Cheryl; Murphy, Vince; Shoemaker, James A.W.; Tracht, Ursula; Turner, Howard; Zhang, Jessica; Uno, Tetsuo; Rosen, Robert K. and Stevens, James C.; A Fully Integrated High-Throughput Screening Methodology for the Discovery of New Polyolefin Catalysts: Discovery of a New Class of High Temperature Single-Site Group (IV) Copolymerization Catalysts; Journal of the American Chemical Society, 2003, vol. 125, pp. 4306-4317.

Guerin, Frederic; Stewart, Jeffrey C.; Beddie, Chad and Stephan, Douglas W.; Synthesis, Structure, and Reactivity of the Phosphinimide Compleses (t-Bu3PN)nMX4-n (M=Ti, Zr); 2000 American Chemical Society; Organometallics, vol. 19, pp. 2994-3000.

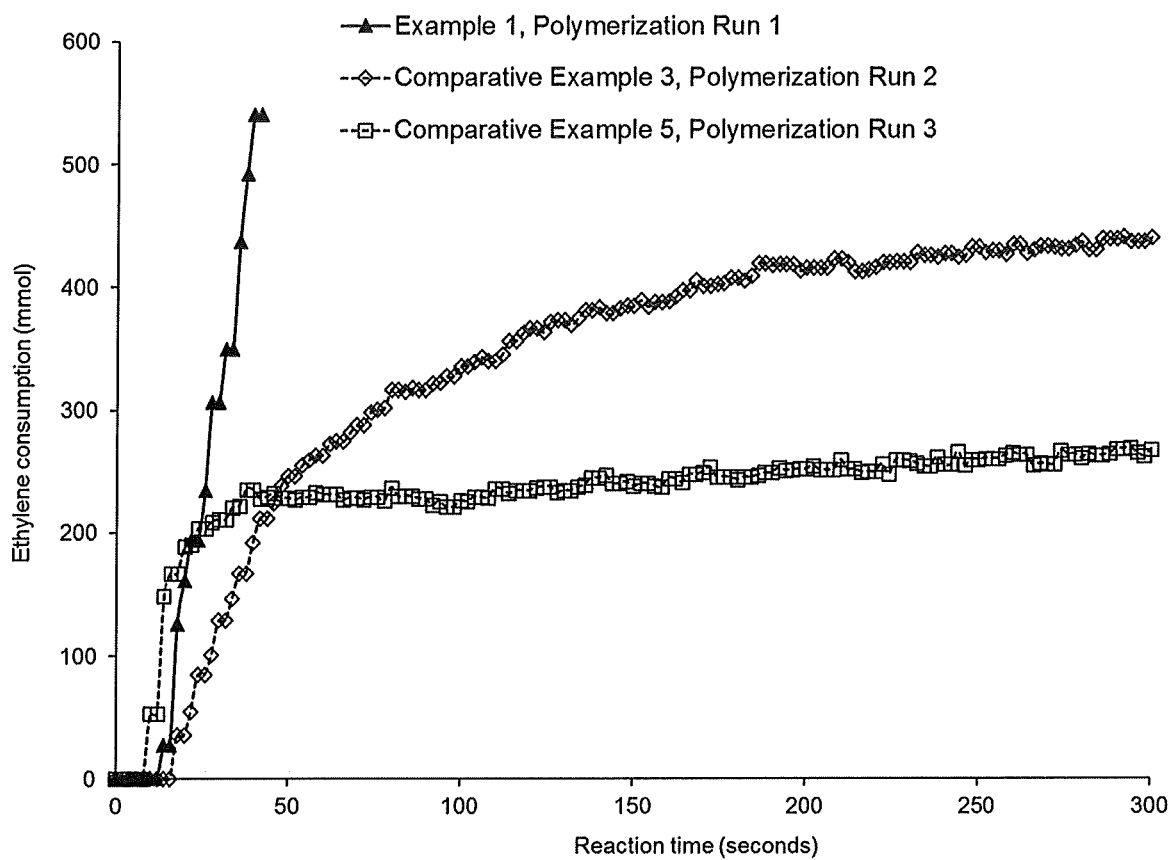
Ethylene Consumption Profiles for Polymerization Runs 1 to 3.

PHOSPHINIMINE AMIDO-ETHER COMPLEXES

CROSS REFERENCE TO RELATED APPLICATIONS

This application claims the benefit of the filing date of U.S. Provisional Application No. 62/662,915, which was filed on Apr. 26, 2018. The contents of U.S. Application 62/662,915 are incorporated by reference in their entirety.

TECHNICAL FIELD

The present disclosure relates to a new family of group 4 organometallic complexes having a phosphinimne ligand and an amido-ether ligand and olefin polymerization catalyst systems that employ these complexes.

BACKGROUND

Bis(phosphinimine) complexes of titanium, and the use of these complexes as olefin polymerization catalysts, are disclosed in United States Patent Number (U.S. Pat. No. 6,239,238 (Brown et al., to NOVA Chemicals International S.A.).

Titanium complexes having a cyclopentadienyl ligand and a phosphinimine ligand, and the use of such complexes as olefin polymerization catalysts, is disclosed in U.S. Pat. No. 6,063,879 (Stephan et al, to NOVA Chemicals International S.A.). Organometallic complexes having a phosphinimine ligand and another heteroatom ligand are disclosed in U.S. Pat. No. 6,147,172 (Brown et al., to NOVA Chemicals International S.A.).

Organometallic complexes (based on a group 3 to group 8 metal) that have two heteroatoms x and y (with each of x and y being selected from N, O, S, and P) that are connected by a bridging group are disclosed in several patents in the name of Murray (See U.S. Pat. Nos. 6,103,657; 6,320,005; and 6,610,627 (Murray; to Union Carbide Corporation)). The use of several of these complexes as catalysts for olefin polymerization is also disclosed. Published U.S. application 2002/049288 Goh et al.) also makes a similar disclosure to the Murray Patents.

SUMMARY

In one embodiment, the present disclosure provides a complex having the formula $(PI)(AE)ML_2$, wherein:

I) PI is a phosphinimine ligand defined by the formula:

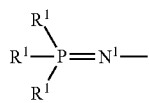

where each $R^1$ is independently selected from a group consisting of a hydrogen atom; a $C_{1-30}$ hydrocarbyl radical, which hydrocarbyl radical is unsubstituted or further substituted by a halogen atom; a $C_{1-10}$ alkoxy radical; a $C_{6-10}$ aryl or aryloxy radical; an amido radical; a silyl radical or a germanyl radical; II) AE is an amido-ether ligand defined by the formula:

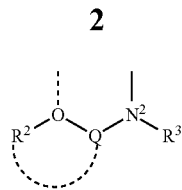

where Q is a bridging group between oxygen, 0 and nitrogen, $N^2$, and contains one or more atoms selected from group consisting of Group 13 to 16 elements; $R^2$ is a group containing 1 to 50 atoms selected from the group consisting of hydrogen and Group 13 to 17 elements; $R^3$ is a group containing 1 to 50 atoms selected from the group consisting of hydrogen and Group 13 to 17 elements; and wherein the $R^2$ group optionally joins together with the bridging group Q;

III) each L is an activatable ligand; and

IV) M is a metal selected from the group consisting of Zr and Hf, and wherein $N^1$, $N^2$ and optionally 0 are bonded to M.

In another embodiment, the present disclosure provides an olefin polymerization catalyst system comprising
1) a phosphinimine/amido-ether complex defined above; and
2) an activator.

In another embodiment, the present disclosure provides a process for the polymerization of olefins employing the olefin polymerization catalyst system defined above.

BRIEF DESCRIPTION OF THE DRAWING

The FIGURE illustrates rates of ethylene consumption.

DETAILED DESCRIPTION

Amido Ether Ligand
AE is an amido-ether ligand defined by the formula:

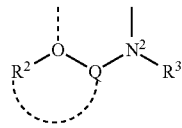

where Q is a bridging group between oxygen, O and nitrogen, $N^2$, and contains one or more atoms selected from group consisting of Group 13 to 16 elements; $R^2$ is a group containing 1 to 50 atoms selected from the group consisting of hydrogen and Group 13 to 17 elements; $R^3$ is a group containing 1 to 50 atoms selected from the group consisting of hydrogen and Group 13 to 17 elements; and wherein the $R^2$ group optionally joins together with the bridging group Q.

In an embodiment, the bridge Q is an aryl group. In an embodiment, the N atom and the O atom of the above formula are substituents on adjacent atoms of an aryl group (as illustrated for example, by the organometallic complex shown in Example 1 of the present examples).

In an embodiment, the 0 atom is part of a furan ring.

Phosphinimine Ligand

The phosphinimine ligand is defined by the formula: $R^1{}_3P=N-$, where N bonds to the metal, and wherein each $R^1$ is independently selected from the group consisting of a hydrogen atom; a halogen atom; $C_{1-20}$ hydrocarbyl radicals which are unsubstituted or further substituted by one or more halogen atom and/or $C_{1-20}$ alkyl radical; $C_{1-8}$ alkoxy radical; $C_{6-10}$ aryl or aryloxy radical (the aryl or aryloxy radical optionally being unsubstituted or further substituted by one or more halogen atom and/or $C_{1-20}$ alkyl radical); amido radical; silyl radical of the formula: —SiR'$_3$ wherein each R' is independently selected from the group consisting of hydrogen, a $C_{1-8}$ alkyl or alkoxy radical, $C_{6-10}$ aryl or aryloxy radicals; and germanyl radical of the formula: —GeR'$_3$ wherein R' is as defined above.

In an embodiment of the disclosure the phosphinimine ligand is chosen so that each R is a hydrocarbyl radical. In a particular embodiment of the disclosure, the phosphinimine ligand is tri-(tertiarybutyl)phosphinimine (i.e. where each $R^1$ is a tertiary butyl group, or "t-Bu" for short).

Activatable Ligand

The term "activatable ligand" refers to a ligand which may be activated by a cocatalyst (also referred to as an "activator"), to facilitate olefin polymerization. An activatable ligand L may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand L may also be transformed into another ligand which is cleaved or abstracted from the metal center M (e.g., a halide may be converted to an alkyl group). Without wishing to be bound by any single theory, protonolysis or abstraction reactions generate an active "cationic" metal center which can polymerize olefins. In embodiments of the present disclosure, the activatable ligand, L is independently selected from the group consisting of a hydrogen atom; a halogen atom; a $C_{1-10}$ hydrocarbyl radical; a $C_{1-10}$ alkoxy radical; a $C_{6-10}$ aryl oxide radical, each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical; an amido radical which is unsubstituted or substituted by up to two $C_{1-8}$ alkyl radicals; and a phosphido radical which is unsubstituted or substituted by up to two $C_{1-8}$ alkyl radicals. Two activatable L ligands may also be joined to one another and form for example, a substituted or unsubstituted diene ligand (e.g., 1,3-diene); or a delocalized heteroatom containing group such as an acetate group.

The number of activatable ligands depends upon the valency of the metal and the valency of the activatable ligand. In some embodiments, the preferred phosphinimine catalysts are based on group 4 metals in their highest oxidation state (i.e. 4+). Particularly suitable activatable ligands are monoanionic such as a halide (e.g., chloride) or a hydrocarbyl (e.g., methyl, benzyl).

In some instances, the metal of the phosphinimine catalyst may not be in the highest oxidation state. For example, a titanium (III) component would contain only one activatable ligand.

The Activator

In the present disclosure, the single site catalyst is used in combination with at least one activator (or "cocatalyst") to form an active polymerization catalyst system for olefin polymerization. Activators (i.e. cocatalysts) include ionic activator cocatalysts and aluminoxane cocatalysts.

Aluminoxane (Also Referred to as Alkylaluminoxane)

The activator used to activate the single site catalyst can be any suitable activator including one or more activators selected from the group consisting of alkylaluminoxanes and ionic activators, optionally together with an alkylating agent. Without wishing to be bound by theory, the alkylaluminoxanes are complex aluminum compounds of the formula: $R^4_2Al^1O(R^4Al^1O)_mAl^1R^4_2$, wherein each $R^4$ is independently selected from the group consisting of $C_{1-20}$ hydrocarbyl radicals and m is from 3 to 50. Optionally, a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes are typically used in substantial molar excess compared to the amount of group 4 transition metal in the single site catalyst. The $Al^1$:group 4 transition metal molar ratios are from 10:1 to 10,000:1, such as about 30:1 to 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present disclosure may be a combination of an alkylating agent (which may also serve as a scavenger) with an activator capable of ionizing the group 4 metal of the single site catalyst (i.e. an ionic activator). In this context, the activator can be chosen from one or more alkylaluminoxane and/or an ionic activator.

When present, the alkylating agent may be selected from the group consisting of $(R^*)_pMgX^2_{2-p}$ wherein $X^2$ is a halide and each $R^*$ is independently selected from the group consisting of $C_{1-10}$ alkyl radicals and p is 1 or 2; R*Li wherein in R* is as defined above, $(R^*)_qZnX^2_{2-q}$ wherein R* is as defined above, $X^2$ is halogen and q is 1 or 2; $(R^4)_sAl^2X^2_{3-s}$ wherein R* is as defined above, $X^2$ is halogen and s is an integer from 1 to 3. In some embodiments, R* is a $C_{1-4}$ alkyl radical, and $X^2$ is chlorine. Commercially available compounds include triethyl aluminum (TEAL), diethyl aluminum chloride (DEAC), dibutyl magnesium ((Bu)$_2$Mg), and butyl ethyl magnesium (BuEtMg or BuMgEt).

Ionic Activator

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-5}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In some embodiments, in the above compounds, preferably $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g., PhR$^8_2$NH$^+$, which is substituted by two $R^8$ radicals such as for example two $C_{1-4}$ alkyl radicals).

Examples of compounds capable of ionizing the single site catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl) boron, tributylammonium tetra(p-trifluoromethylphenyl) boron, tributylammonium tetra(pentafluorophenyl)boron, tri (n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl) boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltrispentafluorophenyl borate, triphenylmethylium phenyltrispentafluorophenyl borate, benzene (diazonium) phenyltrispentafluorophenyl borate, tropillium tetrakis (2,3, 5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4, 5-trifluorophenyl) borate, benzene (diazonium) tetrakis (3,4, 5-trifluorophenyl) borate, tropillium tetrakis (1,2,2-trifluoroethenyl) borate, trophenylmethylium tetrakis (1,2, 2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3, 4,5-tetrafluorophenyl) borate, and benzene (diazonium) tetrakis (2,3,4,5-tetrafluorophenyl) borate.

Commercially available activators which are capable of ionizing the group 4 metal of the single site catalyst include: N,N-dimethylaniliniumtetrakispentafluorophenyl borate ("[Me$_2$NHPh][B(C$_6$F$_5$)$_4$]"); triphenylmethylium tetrakis-pentafluorophenyl borate ("[Ph$_3$C][B(C$_6$F$_5$)$_4$]"); and tris-pentafluorophenyl boron and MAO (methylaluminoxane) and MMAO (modified methylaluminoxane).

The ionic activators compounds may be used in amounts which provide a molar ratio of group 4 transition metal to boron that will be from 1:1 to 1:6. Optionally, mixtures of alkylaluminoxanes and ionic activators can be used as activators in the polymerization catalyst.

Catalyst System

The catalyst precursor, the activator, or the entire catalyst composition may be impregnated onto a solid, inert support, in liquid form such as a solution, dispersion or neat liquid, spray dried, in the form of a prepolymer, or formed in-situ during polymerization.

In the case of a supported catalyst composition, the catalyst composition may be impregnated in or deposited on the surface of an inert substrate such as silica, carbon black, polyethylene, polycarbonate porous crosslinked polystyrene, porous crosslinked polypropylene, alumina, thoria, zirconia, or magnesium halide (e.g., magnesium dichloride), such that the catalyst composition is between 0.1 and 90 percent by weight of the total weight of the catalyst composition and the support.

Polymerization Process

The catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

1. Gas Phase

When gas phase polymerization is employed, pressures may be in the range of 1 to 1000 psi, such as 50 to 400 psi, for example 100 to 300 psi, and temperatures in the range of 30° C. to 130° C., for example 65° C. to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, including aluminum alkyls, such as triisobutylaluminum.

Conventional adjuvants may be included in the process, provided they do not interfere with the operation of the catalyst composition in forming the desired polyolefin. Hydrogen or a metal or non-metal hydride (e.g., a silyl hydride) may be used as a chain transfer agent in the process. Hydrogen may be used in amounts up to about 10 moles of hydrogen per mole of total monomer feed.

Olefin polymers that may be produced according to the disclosure include, but are not limited to, ethylene homopolymers, homopolymers of linear or branched higher alpha-olefins containing 3 to about 20 carbon atoms, and interpolymers of ethylene and such higher alpha-olefins, with densities ranging from about 0.86 to about 0.96. Suitable higher alpha-olefins include, for example, propylene, 1-butene, 1-pentene, 1-hexene, 4-methyl-1-pentene, 1-octene, and 3,5,5-trimethyl-1-hexene. Olefin polymers according to the disclosure may also be based on or contain conjugated or non-conjugated dienes, such as linear, branched, or cyclic hydrocarbon dienes having from about 4 to about 20 carbon atomes, for example 4 to 12 carbon atoms. In some embodiments, preferred dienes include 1,4-pentadiene, 1,5-hexadiene, 5-vinyl-2-norbornene, 1,7-octadiene, vinyl cyclohexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the disclosure as well. Specific olefin polymers that may be made according to the disclosure include, for example, polyethylene, polypropylene, ethylene/propylene rubbers (EPR's), ethylene/propylene/diene terpolymers (EPDM's), polybutadiene, polyisoprene and the like.

2. Slurry Process

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic, or a cycloalkane. The diluent may also be the alpha olefin comonomer used in copolymerizations. Alkane diluents include propane, butanes, (i.e. normal butane and/or isobutane), pentanes, hexanes, heptanes, and octanes. The monomers may be soluble in (or miscible with) the diluent, but the polymer is not (under polymerization conditions). The polymerization temperature can be from about 5° C. to about 200° C. In some embodiments, the polymerization temperature is less than about 120° C., such as from about 10° C. to about 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000 to 9100 kPa) when propane is used (see, for example, U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g., an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

3. Solution Polymerization

Solution processes for the copolymerization of ethylene and an alpha olefin having from 3 to 12 carbon atoms are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is ISOPAR™ E ($C_{8-12}$ aliphatic solvent, Exxon Chemical Co.).

In general, a solution polymerization process may use one, two (or more) polymerization reactors.

In an embodiment, the polymerization temperature in at least one CSTR (continuous stirred tank reactor) is from about 80° C. to about 280° C. (e.g., from about 120° C. to 220° C.) and a tubular reactor is operated at a slightly higher temperature. Cold feed (i.e. chilled solvent and/or monomer) may be added to the CSTR(s). The polymerization enthalpy heats the reactor. The polymerization solution which exits in the reactor may be more than 100° C. hotter than the reactor feed temperature. Agitation efficiency in the CSTR may be determined by measuring the reactor temperature at several different points. The largest temperature difference (i.e. between the hottest and coldest temperature measurements) is described as the internal temperature gradient for the polymerization reactor. A very well mixed CSTR has a maximum internal temperature gradient of less than 10° C. An example agitator system is described in copending and commonly assigned U.S. Pat. No. 6,024,483. In some embodiments, preferred pressures are from about 500 psi to 8,000 psi. In some embodiments, the preferred reaction process is a "medium pressure process", which means that the pressure in each reactor is less than about 6,000 psi (about 41,000 kiloPascals or kPa)—for example, from about 1,500 psi to 3,000 psi (about 10,000-21,000 kPa).

If more than one CSTR is employed, catalyst can be added to each of the CSTR(s) in order to maintain a high reactor rate. The catalyst used in each CSTR may be the same or different, but it is generally preferable to use the same type of catalyst in each CSTR. In some embodiments, at least 60 weight % of the ethylene fed to the CSTR(s) is polymerized to polyethylene in the CSTR(s). For example, at least 70 weight % of the ethylene fed to the CSTR(s) can be polymerized to polyethylene in the CSTR(s).

If it is desired to use a mixed catalyst system in which one catalyst is a single site catalyst and one catalyst is a Ziegler-Natta (Z/N) catalyst, then the single site catalyst can be employed in the first CSTR and the Z/N catalyst can be employed in the second CSTR.

A tubular reactor that is connected to the discharge of the at least on CSTR may also be employed. If two CSTR's are used in series, then the tubular reactor receives the discharge from the second CSTR.

The term "tubular reactor" is meant to convey its conventional meaning: namely a simple tube. The tubular reactor of this disclosure will have a length/diameter (L/D) ratio of at least 10/1. The tubular reactor is not agitated. The tubular reactor can be operated adiabatically. Thus, as polymerization progresses, the remaining comonomer is increasingly consumed and the temperature of the solution increases (both of which improve the efficiency of separating the remaining comonomer from the polymer solution). The temperature increase along the length of the tubular reactor may be greater than 3° C. (i.e. that the discharge temperature from the tubular reactor is at least 3° C. greater than the discharge temperature from the CSTR that feeds the tubular reactor).

Optionally, the tubular reactor may also have feed ports for additional catalyst, cocatalyst, comonomer and/or telomerization agent (such as hydrogen). However, in some embodiments, preferably no additional catalyst is added to the tubular reactor.

The total volume of the tubular reactor can be at least 10 volume % of the volume of the at least one CSTR, especially from 30% to 200% (for clarity, if the volume of the CSTR is 1000 liters, then the volume of the tubular reactor is at least 100 liters; for example, from 300 to 2000 liters).

Addition of Monomers and Solvent

Suitable monomers for copolymerization with ethylene include $C_{3-12}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene. In some embodiments, octene-1 is preferred.

In an embodiment, the monomers are dissolved/dispersed in the solvent either prior to being fed to the first CSTR (or for gaseous monomers the monomer may be fed to the reactor so that it will dissolve in the reaction mixture). Prior to mixing, the solvent and monomers are generally purified to remove potential catalyst poisons such as water, oxygen or other polar impurities. The feedstock purification follows standard practices in the art, e.g. molecular sieves, alumina beds and oxygen removal catalysts are used for the purification of monomers. The solvent itself as well (e.g., methyl pentane, cyclohexane, hexane or toluene) can be treated in a similar manner.

Generally, the catalyst components may be premixed in the solvent for the reaction or fed as separate streams to each reactor.

In some instances, premixing may be desirable to provide a reaction time for the catalyst components prior to entering the first CSTR. Such an "in-line mixing" technique is described in the patent literature (most notably U.S. Pat. No. 5,589,555, issued Dec. 31, 1996 to DuPont Canada Inc.).

The residence time in each reactor will depend on the design and the capacity of the reactor. Generally, the reactors can be operated under conditions to achieve a thorough mixing of the reactants. As previously noted, the polymerization reactors are arranged in series (i.e. with the solution from the at least one CSTR being transferred to the tubular reactor).

EXAMPLES

General

General Experimental Methods

All reactions involving air and/or moisture sensitive compounds were conducted under nitrogen using standard Schlenk and glovebox techniques. Reaction solvents were purified using the system described by Grubbs et al. (see Pangborn, A. B.; Giardello, M. A.; Grubbs, R. H.; Rosen R. K.; Timmers, F. J. *Organometallics* 1996, 15, 1518-1520) and then stored over activated molecular sieves in an inert atmosphere glovebox. Triphenylcarbenium tetrakis(pentafluorophenyl)borate was purchased from Albemarle Corp. and used as received. The phosphinimine ligand t-Bu$_3$PNH and (t-Bu$_3$PN)TiMe$_3$ were prepared using the established methods (see Stephan, D. W. et al. *Can. J. Chem.* 2003, 81, 1471-1476 and Stephan, D. W. et al. *Organometallics* 2000, 19, 2994-3000, respectively). The hafnium complex [(2-(OMe)C$_6$H$_4$)(2,4,6-Me$_3$C$_6$H$_2$)N]Hf(CH$_2$Ph)$_3$ was prepared as described by Murphy, V. et al. in *J. Am. Chem. Soc.* 2003, 125, 4306-4317. Deuterated solvents were purchased from Sigma Aldrich (toluene-d$_8$) and were stored over 4 Å molecular sieves prior to use. NMR spectra were recorded on a Bruker 400 MHz spectrometer ($^1$H NMR at 400.1 MHz, $^{31}$P NMR at 162 MHz, and $^{19}$F NMR at 376 MHz).

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e., the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

Example 1

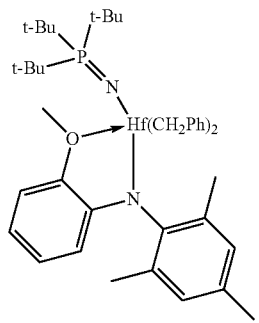

To a toluene solution (10 mL) of [(2-(OMe)C$_6$H$_4$)(2,4,6-Me$_3$C$_6$H$_2$)N]Hf(CH$_2$Ph)$_3$ (0.58 g, 0.83 mmol) was added a toluene solution (10 mL) of t-Bu$_3$PNH (0.18 g, 0.83 mmol) dropwise over 5 min at ambient temperature. The solution was stirred for 2 hours and then concentrated to dryness under vacuum. The solid residue was triturated with pentane and then concentrated again to dryness under vacuum. The crude product was isolated as an off-white solid with high purity (0.65 g, 95%). $^1$H NMR (toluene-d$_8$): 1.09 (d, J=12.7 Hz, 27H), 2.12 (s, 6H), 2.21 (s, 3H), 2.26 (d, J=12.1 Hz, 2H), 2.34 (d, J=12.1 Hz, 2H), 3.01 (s, 3H), 5.92 (dd, J=7.9, 1.4 Hz, 1H), 6.41 (dd, J=8.1, 1.1 Hz, 1H), 6.50 (m, 1H), 6.71 (m, 1H), 6.73 (m, 2H), 6.82 (s, 2H), 6.92 (d, J=7.4 Hz, 4H), 7.01 (m, 4H). $^{31}$P{$^1$H} NMR: 38.0.

Comparative Example 2

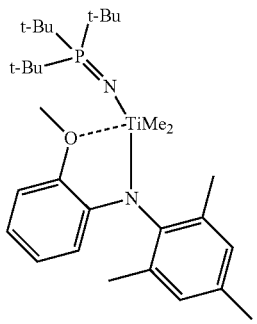

To a toluene solution (10 mL) of (t-Bu$_3$PN)TiMe$_3$ (0.16 g, 0.52 mmol) was added a toluene solution (10 mL) of [(2-(OMe)C$_6$H$_4$)(2,4,6-Me$_3$C$_6$H$_2$)NH (0.13 g, 0.52 mmol). The solution was stirred for 18 hours at ambient temperature and then concentrated to dryness under vacuum. The residue was slurried in pentane, cooled to −35° C., decanted and dried to give the product in high purity as an off-white solid (0.23 g, 93%). $^1$H NMR (toluene-d$_8$): 0.71 (s, 6H), 1.18 (d, J=13.2 Hz, 27H), 2.10 (s, 6H), 2.23 (s, 3H), 4.00 (s, 3H), 5.94 (dd, J=8.0, 1.2 Hz, 1H), 6.64 (m, 1H), 6.79 (m, 2H), 6.82 (m, 2H). $^{31}$P{$^1$H} NMR: 29.5.

Comparative Example 3

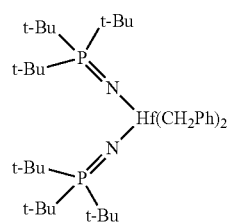

To a toluene solution (10 mL) of Hf(CH$_2$Ph)$_4$ (1.92 g, 3.54 mmol) was added a toluene solution (40 mL) of t-Bu$_3$PNH (1.54 g, 7.09 mmol) dropwise at 0° C. over 10 minutes. The resulting yellow solution was stirred at ambient temperature for 5 hours. The volatiles were removed under vacuum and the brown oily residue was triturated and decanted several times with cold pentane (30 mL portions). The solid was dried under vacuum and isolated as a pale yellow solid (2.66 g; 95%). $^1$H NMR (toluene-d$_8$): 1.20 (d, J=12.3 Hz, 54H), 2.17 (s, 4H), 6.82 (tm, J=7.0 Hz, 2H), 7.16 (m, 4H), 7.19 (m, 4H). $^{31}$P{$^1$H} NMR: 37.4.

Comparative Example 4

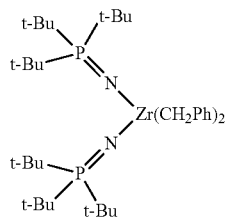

Comparative Example 4 was prepared using an analogous procedure to Example 3. The product was isolated as pale yellow solid (3.38 g; 94%). $^1$H NMR (toluene-cis): 1.22 (d, J=12.4 Hz, 54H), 2.23 (s, 4H), 6.85 (tm, J=7.2 Hz, 2H), 7.11 (m, 4H), 7.18 (m, 4H). $^{31}$P{$^1$H} NMR: 30.3.

Comparative Example 5

Comparative Example 5, [(2-(OMe)C$_6$H$_4$)(2,4,6-Me$_3$C$_6$H$_2$)N]Hf(CH$_2$Ph)$_3$, was prepared as described by Murphy, V. et al. in J. Am. Chem. Soc. 2003, 125, 4306-4317.

Semi-Batch Homopolymerization Experiments

Semi-batch homopolymerization experiments were conducted in a 1000 mL reactor equipped with a pitched blade impeller coupled with a gas entrainment impeller to maximize gas dispersion in the liquid. A baffle is installed in the reactor to enhance the turbulence within the liquid. Heating of the reactor is performed using an electric element heater. The entire system is housed in a nitrogen-purged cabinet to maintain an oxygen deficient environment during the polymerization process. The reactor uses a programmable logical control (PLC) system with Specview software as a method of process control.

For Polymerization Runs 1 to 3, the reactor was heated to the target temperature of 140° C. and charged with cyclohexane (400 mL). The reactor was then pressurized to 110 psig with ethylene and allowed to equilibrate for 5 minutes. Solutions of catalyst materials were prepared in a glovebox and loaded via cannula into catalyst injection tubes equipped with solenoid-operated valves and fixed to the reactor head. To initiate the reaction, solutions of the procatalyst (dissolved in 5 mL of toluene; target concentration of 300 μM) and (Ph$_3$C)[B(C$_6$F$_5$)$_4$] (133 mg dissolved in 5 mL of toluene; target concentration of 360 OA) were sequentially injected into the reactor using an over-pressure of argon and the injections staggered by <5 seconds. The reaction pressure was maintained throughout the reaction by feeding ethylene on demand from a 10 L ballast vessel that is continually monitored for temperature and pressure. Upon consumption of 500 mmol of ethylene or 300 seconds of reaction time (whichever happened first), the reactor contents are discharged through a bottom drain valve and heat-traced line (160° C.) into a cooled letdown vessel containing a deactivating solution. The quenched reaction contents were allowed to dry in the fumehood followed by rigorous drying in a vacuum oven and the dried polymer was weighed. Data for semi-batch homopolymerization experiments (Polymerization Runs 1 to 3) are shown in Table 1 and ethylene consumption profiles are shown in the FIGURE.

Continuous Solution Polymerization

Continuous polymerizations were conducted on a continuous polymerization unit (CPU) using cyclohexane as the solvent. The CPU contained a 71.5 mL stirred reactor and was operated between 130 to 160° C. for the polymerization experiments. An upstream mixing reactor having a 20 mL volume was operated at 5° C. lower than the polymerization reactor. The mixing reactor was used to pre-heat the ethylene, octene and some of the solvent streams. Catalyst feeds (xylene or cyclohexane solutions of titanium phosphinimine complex, $(Ph_3C)[B(C_6F_5)_4]$, and MMAO-7/BHEB) and additional solvent were added directly to the polymerization reactor in a continuous process. A total continuous flow of 27 mL/min into the polymerization reactor was maintained.

Copolymers were made at 1-octene/ethylene weight ratios ranging from 0.15 to 0.5. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. The polymerization activity, $k_p$ (expressed in $mM^{-1} \cdot min^{-1}$), is defined as:

$$k_p = \left(\frac{Q}{100-Q}\right)\left(\frac{1}{[M]}\right)\left(\frac{1}{HUT}\right)$$

where Q is ethylene conversion (%) (measured using an online gas chromatograph (GC)), [M] is catalyst concentration in the reactor (mM), and HUT is hold-up time in the reactor (2.6 min).

Copolymer samples were collected at 90±1% ethylene conversion (Q), dried in a vacuum oven, ground, and then analyzed using FTIR (for short-chain branch frequency) and GPC-RI (for molecular weight and distribution). Copolymerization conditions and copolymer properties for Polymerization Runs 4 to 11 are listed in Table 2.

What is claimed is:

1. A complex having the formula $(PI)(AE)ML_2$, wherein:

I) PI is a phosphinimine ligand defined by the formula:

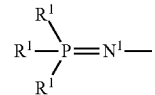

wherein each $R^1$ is independently selected from a group consisting of a hydrogen atom; the $C_{1-30}$ hydrocarbyl radical, which hydrocarbyl radical is unsubstituted or further substituted by a halogen atom; a $C_{1-10}$ alkoxy radical; a $C_{6-10}$ aryl or aryloxy radical; an amido radical; a silyl radical; and a germanyl radical;

II) AE is an amido-ether ligand defined by the formula:

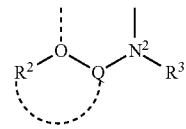

wherein:

Q is a bridging group between oxygen, O, and nitrogen, $N^2$, and contains one or more atoms selected from the group consisting of Group 13 to 16 elements;

$R^2$ is a group containing 1 to 50 atoms selected from the group consisting of hydrogen and Group 13 to 17 elements;

TABLE 1

Semi-batch Ethylene Homopolymerization Experiments

| Polymerization Run. No. | Pro catalyst Example | [M] (μM) | B (from borate)/M | Reactor temp. (° C.) | Reaction pressure (psig) | Reaction time (min) | Amount Ethylene Consumed (mmol) | Activity g PE/(mmol M · hr) |
|---|---|---|---|---|---|---|---|---|
| 1 | 1 | 300 | 1.20 | 140 | 110 | 0.67 | 540 | 13881 |
| 2 | Comp. 3 | 300 | 1.20 | 140 | 110 | 5.00 | 443 | 1290 |
| 3 | Comp. 5 | 300 | 1.20 | 140 | 110 | 5.00 | 268 | 670 |

M = Group 4 metal

TABLE 2

Continuous Ethylene/1-Octene Copolymerization Experiments

| Polymerization Run. No. | Pro-catalyst Example | [M] (μM) | B (from borate)/M | Reactor temp. (° C.) | C2 flow (g/min) | C8/C2 wt/wt | C2 convn, Q (%) | $k_p$ ($mM^{-1} \cdot min^{-1}$) | SCB/ 1000C by FTIR | $M_w$ | PDI, $M_w/M_n$ |
|---|---|---|---|---|---|---|---|---|---|---|---|
| 4 | 1 | 8.15 | 1.20 | 140 | 2.10 | 0.50 | 90.38 | 443 | 12.5 | 61548 | 3.15 |
| 5 | 1 | 5.93 | 1.20 | 140 | 2.10 | 0.30 | 90.69 | 632 | 7.6 | 92142 | 3.77 |
| 6 | 1 | 6.67 | 1.20 | 140 | 2.10 | 0.15 | 89.93 | 515 | 3.2 | 108985 | 3.99 |
| 7 | 1 | 5.19 | 1.20 | 130 | 1.90 | 0.50 | 89.90 | 660 | 10.8 | 86604 | 3.75 |
| 8 | 1 | 34.81 | 1.20 | 160 | 2.70 | 0.50 | 90.78 | 109 | 14.9 | 28729 | 2.21 |
| 9 | Comp. 2 | 3.70 | 1.20 | 140 | 2.10 | 0.50 | 29.93 | 44 | — | — | — |
| 10 | Comp. 3 | 37.04 | 1.20 | 140 | 2.10 | 0.50 | 53.45 | 12 | — | — | — |
| 11 | Comp. 4 | 8.89 | 1.20 | 140 | 2.10 | 0.30 | 26.21 | 15 | — | — | — |

M = Group 4 metal $R^3$ is a group containing 1 to 50 atoms selected from the group consisting of hydrogen and Group 13 to 17 elements; and wherein the $R^2$ group optionally joins together with the bridging group Q;

III) each L is an activatable ligand; and

IV) M is a metal selected from the group consisting of Zr and Hf, and wherein $N^1$, $N^2$ and optionally O are bonded to M.

2. An olefin polymerization catalyst system comprising:
A) an organometallic complex according to claim 1 and
B) an activator.

3. The olefin polymerization catalyst system according to claim 2 wherein the activator is selected from the group consisting of an aluminoxane; an ionic activator; and mixtures thereof.

4. A process for the polymerization of olefins comprising contacting one or more $C_2$ to $C_{10}$ alpha olefins with the olefin polymerization catalyst system of claim 2 under polymerization conditions.

5. The process of claim 4 wherein the one or more $C_2$ to $C_{10}$ alpha olefins consists of a) ethylene; and b) one or more olefins selected from the group consisting of 1-butene; 1-hexene; and 1-octene.

* * * * *